(12) United States Patent  (10) Patent No.: US 9,210,555 B2
Larson et al.                (45) Date of Patent:     Dec. 8, 2015

(54) PULSED INPUT PUSH-TO-TALK WIRELESS ADAPTER SYSTEMS AND METHODS

(71) Applicant: Twisted Pair Solutions, Inc., Seattle, WA (US)

(72) Inventors: David Larson, Seattle, WA (US); Derick Clack, Seattle, WA (US)

(73) Assignee: TWISTED PAIR SOLUTIONS, INC., Seattle, WA (US)

( * ) Notice: Subject to any disclaimer, the term of this patent is extended or adjusted under 35 U.S.C. 154(b) by 156 days.

(21) Appl. No.: 14/054,508

(22) Filed: Oct. 15, 2013

(65) Prior Publication Data

US 2015/0105117 A1    Apr. 16, 2015

(51) Int. Cl.
*H04W 4/10* (2009.01)
*H04W 4/16* (2009.01)
*H04M 1/60* (2006.01)
*H04R 1/10* (2006.01)
*H04R 5/033* (2006.01)

(52) U.S. Cl.
CPC .............. *H04W 4/10* (2013.01); *H04M 1/6058* (2013.01); *H04M 1/6066* (2013.01); *H04R 1/1041* (2013.01); *H04W 4/16* (2013.01); *H04R 5/033* (2013.01); *H04R 2201/107* (2013.01); *H04R 2420/07* (2013.01); *H04R 2420/09* (2013.01)

(58) Field of Classification Search
CPC ............. H04R 2420/09; H04R 1/1033; H04R 1/1041; H04R 2420/03; H04R 5/033
See application file for complete search history.

(56) References Cited

U.S. PATENT DOCUMENTS

| 6,922,473 | B2 | 7/2005 | Turnbull |
| 6,950,627 | B2 | 9/2005 | Vicari |
| 6,979,231 | B2 | 12/2005 | Shinohara |
| 7,224,992 | B2 | 5/2007 | Patino et al. |
| 7,241,179 | B2 | 7/2007 | Chennakeshu |

(Continued)

FOREIGN PATENT DOCUMENTS

| CN | 201774654 U | 3/2011 |
| EP | 1 825 599 B1 | 2/2009 |

(Continued)

OTHER PUBLICATIONS

Howtodothings.com, "How to Wire a 4 connector Audio Jack," Retrieved from URL=http://www.howtodothings.com/electronics/how-to-wire-a-4-connector-audio-jack, on Apr. 24, 2012, 3 pages.

(Continued)

*Primary Examiner* — Sujatha Sharma
(74) *Attorney, Agent, or Firm* — Daniel R. Bestor (57) ABSTRACT

An adaptor that includes a male connector, a control circuit, and a wireless transceiver coupleable to a corresponding female connector on a portable electronic device provides push-to-talk functionality on the portable electronic device. In conjunction with the device operating system, the adaptor converts a first incoming signal to a first number of low impedance/high impedance pulses detectable by the portable electronic device to initiate a push-to-talk session. During the push-to-talk session, the adaptor transceiver wirelessly transmits and receives communication signals (e.g., audio signals) to and from an accessory device communicably coupled to the adapter. In conjunction with the device operating system, the adaptor converts a second incoming signal to a second number of low impedance/high impedance pulses detectable by the portable electronic device to terminate the push-to-talk session.

16 Claims, 6 Drawing Sheets

(56) References Cited

U.S. PATENT DOCUMENTS

| | | |
|---|---|---|
| 7,643,642 B2 | 1/2010 | Patino et al. |
| 7,769,187 B1 | 8/2010 | Farrar et al. |
| 7,774,030 B1 | 8/2010 | Klein |
| 7,813,696 B2 | 10/2010 | Kim |
| 7,818,037 B2 | 10/2010 | Lair et al. |
| 7,869,608 B2 | 1/2011 | Sander et al. |
| 7,885,615 B2 | 2/2011 | Rao et al. |
| 8,019,096 B2 | 9/2011 | Sander et al. |
| 8,095,081 B2 | 1/2012 | Vance |
| 2002/0107053 A1 | 8/2002 | Petez et al. |
| 2003/0008564 A1 | 1/2003 | Lebron |
| 2004/0022395 A1 | 2/2004 | Turnbull |
| 2004/0153585 A1* | 8/2004 | Kawatahara et al. ........... 710/52 |
| 2006/0050917 A1 | 3/2006 | Skillicorn et al. |
| 2006/0229108 A1 | 10/2006 | Cehelnik |
| 2007/0178947 A1 | 8/2007 | Kim |
| 2007/0220560 A1* | 9/2007 | Devine, III ............... 725/78 |
| 2007/0225049 A1 | 9/2007 | Andrada |
| 2008/0200208 A1 | 8/2008 | Llanos et al. |
| 2009/0136058 A1 | 5/2009 | Choi et al. |
| 2009/0227298 A1 | 9/2009 | Fukunaga |
| 2009/0307511 A1 | 12/2009 | Fiennes et al. |
| 2010/0027807 A1* | 2/2010 | Jeon ........................... 381/74 |
| 2010/0054493 A1 | 3/2010 | Lin et al. |
| 2011/0007929 A1 | 1/2011 | Rabu et al. |
| 2011/0033056 A1* | 2/2011 | Johnson et al. ............... 381/58 |
| 2011/0033064 A1* | 2/2011 | Johnson et al. ............ 381/94.1 |
| 2011/0033065 A1* | 2/2011 | Johnson ........................ 381/107 |
| 2011/0099298 A1 | 4/2011 | Chadbourne et al. |
| 2011/0116643 A1 | 5/2011 | Tiscareno et al. |
| 2011/0116646 A1 | 5/2011 | Sander et al. |
| 2011/0116647 A1 | 5/2011 | Terlizzi et al. |
| 2011/0116675 A1 | 5/2011 | Terlizzi et al. |
| 2011/0116747 A1 | 5/2011 | Terlizzi et al. |
| 2011/0116750 A1 | 5/2011 | Terlizzi et al. |
| 2011/0116751 A1 | 5/2011 | Terlizzi et al. |
| 2011/0188669 A1 | 8/2011 | Lu |
| 2011/0227631 A1 | 9/2011 | Yamkovoy et al. |
| 2011/0263303 A1 | 10/2011 | Lowles et al. |
| 2011/0300751 A1 | 12/2011 | Wittenberg et al. |
| 2012/0294454 A1 | 11/2012 | Sakamoto et al. |
| 2013/0087614 A1* | 4/2013 | Limtao et al. ............ 235/449 |
| 2013/0195283 A1 | 8/2013 | Larson et al. |

FOREIGN PATENT DOCUMENTS

| | | |
|---|---|---|
| EP | 2194438 A1 | 6/2010 |
| JP | 5-167660 A | 7/1993 |
| KR | 10-2006-0083737 A | 7/2006 |
| KR | 10-2009-0021431 A | 3/2009 |
| WO | 99/57937 A1 | 11/1999 |
| WO | 2008028175 A2 | 3/2008 |
| WO | 2012/024775 A1 | 3/2012 |

OTHER PUBLICATIONS

International Search Report and Written Opinion for corresponding International Application No. PCT/US2013/024464, mailed May 15, 2013, 11 pages.

International Search Report and Written Opinion for corresponding International Application No. PCT/US2013/030568, mailed Jun. 27, 2013, 11 pages.

Larson et al., "Enabling PTT on Smart Phones Using Input Pulses," U.S Appl. No. 61/624,204, filed Apr. 13, 2012, 18 pages.

Larson et al., "Pulsed Input Push-To-Talk Systems, Methods and Apparatus," U.S. Appl. No. 13/795,524, filed Mar. 12, 2013, 47 pages.

PCT International Search Report Dated Feb. 3, 2015 for Counterpart Application PCT/2014/060355.

* cited by examiner

PULSED INPUT PUSH-TO-TALK WIRELESS ADAPTER SYSTEMS AND METHODS

BACKGROUND

1. Technical Field

This disclosure generally relates to a wireless adapter that provides push-to-talk functionality on portable devices not equipped with native push-to-talk functionality.

2. Description of the Related Art

Over a relatively short period of time, the cellular telephone has grown from a dedicated communication device to a multipurpose device having a surprising number of functions controlled using an architecture and processor closely resembling a dedicated computing device—giving birth to the term "smartphone." Current smartphones have any of a number of female connectors disposed about the smartphone housing. Such female connectors can include a tip-ring-sleeve (referred to as a "TRS" jack) or a tip-ring-ring-sleeve (referred to as a "TRRS" jack) to accommodate audio input and/or audio output using external devices other than the speaker(s) and microphone(s) integrated into the body of the smartphone. Such female connectors can include one or more industry standard communications interfaces, such as universal serial bus "USB" or micro-USB connectors. Such female connectors can include one or more proprietary communications interfaces, such as the Lightning® connector used by Apple® Inc.

A popular smartphone feature is push-to-talk functionality. When using a push-to-talk mode, the smartphone user provides an input to the smartphone to place the smartphone in transmit or broadcast mode where the microphone is enabled. Transmit or broadcast mode is exited or ended when the smartphone user provides a second input to the smartphone indicating the termination of transmit or broadcast mode.

Push-to-talk functionality may be provided by adding conductors to the traditional tip-ring-ring-sleeve connector (e.g. a tip-ring-ring-ring-sleeve or TRRRS plug and jack). The added conductors provide one or more additional signal paths to the smartphone, which when coupled with appropriate changes to the smartphone operating system or software may be used to enter and exit a push-to-talk mode. Such added conductors require modification to smartphone components such as the jack which must be altered to accommodate the extra conductor on the TRRRS plug. Additionally, smartphone software or firmware may require modification or updating to support PTT functionality based on a modified TRRRS jack. Such modifications may be costly and inefficient, particularly when manufacturers resort to the use of customized or proprietary algorithms to facilitate PTT functionality.

BRIEF SUMMARY

Most wireless communication devices have at least one female connector or jack to provide a communications interface with one or more external devices. Such interfaces may include a TRS or TRRS audio input/output jack used to provide left and right audio output channels and a single audio input channel. Such interfaces may additionally or alternatively include one or more female connectors fabricated to a recognized or industry standard. For example, one or more universal serial bus ("USB") or micro-USB connectors used to provide a single data input/output channel between the wireless communication device and an external device as well as to provide power to charge the wireless communication device battery. Such interfaces may include one or more company or device specific or proprietary connectors. For example, one or more Lightning® connectors used to provide any number of data input/output channels between the wireless communication device and an external device as well as to provide power to charge the wireless communication device battery. In addition to providing any number of input/output channels, such connectors also provide an external device with the ability to interface with the device operating system.

Wireless push-to-talk headsets provide flexible communication capabilities and are configurable for use in virtually any environment. From simple earbuds and an inline microphone worn beneath clothing, uniforms, and/or equipment to noise-limiting or noise-cancelling "earmuff" style headsets used in noisy environments such as airports and industrial settings, the versatility of a wireless headset is apparent. Wireless headsets providing push-to-talk functionality to remote users via a communicably coupled smartphone offer even greater operational advantages. The ability to use such "off the shelf" type push-to-talk headsets with any wireless communication device, even those wireless communication devices not equipped with native push-to-talk functionality, thus provides significant advantages including ease of use and cost effectiveness.

An adaptor communicably couples a wireless push-to-talk headset to the smartphone. Such a communicable coupling may be formed directly between a transceiver in the push-to-talk headset and a transceiver in the adaptor coupled to the jack on the wireless communication device. Such a communicable coupling may be indirect through one or more intervening devices, for example a tethered or wired push-to-talk headset is communicably coupled via tether to an intervening wireless module. A transceiver in the wireless module may communicably couple to a transceiver in the adaptor coupled to the jack on the wireless communication device. In some instances, such an intervening device may include one or more circuits or processors that convert all or a portion of the communications protocol of the push-to-talk headset to a protocol compatible with the adaptor.

The adaptor includes a housing that includes at least a male connector or plug assembly compatible with the female connector or jack on a wireless communication device. Such connectors may include a male TRS or TRRS audio plug. Such connectors may include a male communications interface connector configured to comply with one or more recognized or industry standards such as a USB or micro-USB connector compliant with one or more USB standards. Such connectors may include a male communications interface connector configured to comply one or more corporate or device specific proprietary standards such as a Lightning® connector or Apple 30 pin connector compliant with one or more proprietary standards of Apple®, Inc.

The adaptor may convert some or all of the signals and/or data communicated by the push-to-talk headset to a different form or format. For example, the adaptor may convert a signal indicative of a transition of a user-actuated input device from a first state to a second state (e.g., a button press event) to a first defined pulse sequence detectable by the device operating system or by an application executed by the device processor. Similarly, the adaptor may convert a signal indicative of a transition of the user-actuated input device from the second state back to the first state (e.g., a button release event) to a second defined pulse sequence detectable by the device operating system or an application executed by the device processor.

The adaptor communicates the pulse sequences to the wireless communication device via the male connector. The first defined pulse sequence may be interpreted by the wireless communication device as an instruction to initiate a push-to-talk mode in which the microphone remains open (i.e., signals on the microphone circuit are communicated by the wireless communication device) until the second defined pulse sequence is received. The second defined pulse sequence may be interpreted by the wireless communication device as an instruction to terminate the push-to-talk mode.

Within the adaptor, a pulse generator circuit can be used to generate one or more pulse patterns. Such pulses may be generated forming a momentary or temporally transitory low impedance circuit. The generation of any number of pulse patterns, each distinguishable from the others, can enable the transmission of clearly defined and easily identified signals via the male plug to the wireless communication device. Such can provide the wireless communication device with robust PTT capabilities while requiring no modification to the wireless communication device hardware and minimal or no modifications to the wireless communication device operating system. Such also provides the ability to use a wide variety of available push-to-talk headset devices with a wireless communication device, even those wireless communication devices not equipped with native push-to-talk functionality. From a user perspective, such also beneficially provides a "plug and play" type system where the adaptor is configured to autonomously communicably couple to the push-to-talk headset upon coupling the adaptor to the wireless communication device.

Activation of a user-actuatable input device such as a mechanical, electrical, or electromechanical switch or button on the push-to-talk headset may cause the adaptor to generate a number of signals each having a similar or different pulse count, pulse number, pulse frequency or the like. Some or all of these signals may be provided as inputs to the device operating system. Within the wireless communication device, such pulsed signals may be recognized as indicative of distinct PTT button press and PTT button release events. For example, when a user actuates (e.g., PRESSES) the user-actuatable input device on the push-to-talk headset, the adaptor may provide a first signal in the form of a temporally transitory low impedance circuit (e.g., an electrical short) across one or more circuits coupled to the wireless communication device via the male plug. The first signal may include a first number of pulses (e.g., a single pulse having a defined duration). Within the device, receipt of the first signal including the first number of pulses may be interpreted by the operating system or application executed by the device processor as indicating the user's desire to open or initiate a push-to-talk session with one or more external wireless communication devices.

When a user actuates (e.g., RELEASES) the user-actuatable input device on the headset at a second time, the adaptor may provide a second signal in the form of a temporally transitory low impedance circuit (e.g., an electrical short) across one or more circuits coupled to the wireless communication device via the male plug. The second signal may include a second number of pulses that is different from the first number of pulses (e.g., two pulses, each having a defined duration separated by a defined interval). Within the device, receipt of the second signal including the second number of pulses may be interpreted by the device operating system or application executed by the device processor as indicating the user's desire to close or terminate a push-to-talk session with one or more external wireless communication devices.

An adaptor for a wireless communications device having an audio jack to provide communications with one or more wireless accessories, may be summarized as including a housing; a male plug coupled to the housing, the male plug sized, dimensioned and configured to be received by the audio jack; a wireless transceiver at least partially housed by the housing; and a control circuit at least partially housed by the housing, the control circuit communicably coupled to the male plug and the wireless transceiver, the control circuit which, in use, and responsive to the receipt of a signal indicative of a control device transition from a first state to a second state, translates signals received via the wireless transceiver and transmits the translated signals via the male plug to a wireless communications device while the control device remains in the second state.

Responsive to detecting a control device first transition from a first state to a second state, the control circuit may generate and communicate via the male plug a first number of pulses, each pulse comprising a low impedance electrical connection for at least a first duration and each pulse separated from another pulse by a high impedance electrical connection for at least a second duration. Responsive to detecting a control device second transition from the second state to the first state, the control circuit may generate and communicate via the male plug a second number of pulses; and responsive to the receipt of a signal indicative of a control device transitioning from the second state to the first state, the control circuit may terminate transmission of signals via the male plug to the wireless communications device while the control device remains in the first position. The control circuit, in use, may translate signals received via the male plug and may transmit the translated signals via the wireless transceiver to one of the one or more wireless accessories. The male plug may include a plurality of distinct, electrically conductive, segments spaced along a length thereof. The male plug may include at least three (tip-ring-sleeve or "TRS") and no more than four (tip-ring-ring-sleeve or "TRRS") electrically conductive segments that are electrically isolated from each other, and spaced along a length thereof. The male plug may be a 2.5 mm or 3.5 mm male plug. The 2.5 mm or 3.5 mm male plug may be the only male plug on the adaptor. The adaptor may omit any female communications ports. The male plug may include a male communications plug accessible from an exterior of the housing. The male communications plug may include a serial communications interface consisting of four conductors, the four conductors consisting of: a pair of power transmission conductors; and a pair of differential data transmission conductors. The male communications plug may include a serial communication interface consisting of eight conductors, the eight conductors consisting of: a first pair of differential data transmission conductors; a second pair of differential data transmission conductors; a pair of power transmission conductors; a first identification/control conductor associated the first differential data transmission conductor pair; and a second identification/control conductor associated the second differential data transmission conductor pair. The male communications plug may include a communications interface consisting of thirty conductors, the thirty conductors including at least: at least three video or imaging data conductors; at least three power transmission conductors, each suitable for operation at a voltage different than the others; a pair of audio output conductors; and a pair of line input conductors. In use, the wireless transceiver may provide a personal area network that includes at least the wireless accessory, the wireless transceiver using short-wave radio frequency transmissions in the industrial, scientific, and medical ("ISM") radio frequency band of from about 2400 megahertz (MHz) to about 2480 MHz. Responsive to detecting a control device first transition from a first state to a second state, the control circuit may translate the received signals into a first number of pulses, each pulse comprising a low impedance electrical connection for at least a first duration and each pulse separated from another pulse by a high impedance electrical connection for at least a second duration; and, responsive to detecting a control device second transition from the second state to the first state, the push-to-talk device may provide a second number of pulses. The wireless communications device may include a smartphone and the one or more wireless accessories may include at least one wireless headset with a microphone and at least one speaker.

A system for use with a wireless communications device having an audio jack may be summarized as including a wireless accessory having at least one wireless transceiver; an adaptor, the adapter including: a housing; a male plug sized, dimensioned and configured to be received by the wireless communications device audio jack; a wireless transceiver; and a control circuit communicably coupled to the male plug and the wireless transceiver, the control circuit which, in use, and responsive to the receipt of a signal indicative of a control device transition from a first state to a second state, translates signals received via the wireless transceiver and transmits the translated signals via the male plug to the wireless communications device while the control device remains in the second state.

Responsive to detecting the control device transition from the first state to the second state, the control circuit may generate and communicate via the male plug a first number of pulses, each pulse comprising a low impedance electrical connection for at least a first duration and each pulse separated from another pulse by a high impedance electrical connection for at least a second duration. Responsive to detecting a control device transition from the second state to the first state, the control circuit may generate and communicate via the male plug a second number of pulses; and responsive to the receipt of a signal indicative of a control device transitioning from the second state to the first state, the control circuit may terminate transmission of signals via the male plug to the wireless communications device while the control device remains in the first position. The control circuit, in use, may translate signals received via the male plug and may transmit the translated signals via the wireless transceiver to one of the one or more wireless accessories.

A method of operation in an adaptor may be summarized as including receiving one or more signals from a wireless communication device; responsive to receiving the one or more signals, translating the one or more signals by a control circuit communicably coupled to a male plug; and transmitting the one or more translated signals via a wireless transceiver communicably coupled to the control circuit.

Receiving one or more signals from a wireless communication device may include receiving one or more signals from a wireless communication device communicably coupled to a male connector on the adapter via a corresponding audio jack on the wireless communication device.

The method of operation in an adaptor may further include: receiving a signal indicative of a transition of a control device from a first state to a second state via the wireless transceiver; responsive to receiving the signal indicative of the transition of the control device from the first state to the second state, generating and communicating to the wireless communication device via the male plug, a first number of pulses, each pulse comprising a low impedance electrical connection for at least a first duration and each pulse separated from another pulse by a high impedance electrical connection for at least a second duration; and responsive to the control device remaining in the second state, translating signals received via the wireless transceiver and transmitting the translated signals via the male plug to the wireless communication device.

Receiving a signal indicative of a transition of a control device from a first state to a second state via the wireless transceiver may include receiving the signal indicative of a transition of a control device from a first state to a second state from a wireless accessory to which the wireless transceiver is wirelessly communicatively coupled. Transmitting the translated signals via the male plug to the wireless communication device may include: transmitting the translated signals via a male plug consisting of four conductors to a corresponding wireless communication device jack, the four conductors consisting of: a pair of power transmission conductors; and a pair of differential data transmission conductors. Transmitting the translated signals via the male plug to the wireless communication device may include transmitting the translated signals via a male plug consisting of eight conductors to a corresponding wireless communication device jack, the eight conductors consisting of: a first pair of differential data transmission conductors; a second pair of differential data transmission conductors; a pair of power transmission conductors; a first identification/control conductor associated the first differential data transmission conductor pair; and a second identification/control conductor associated the second differential data transmission conductor pair. Transmitting the translated signals via the male plug to the wireless communication device may include transmitting the translated signals via a male plug consisting of thirty conductors to a corresponding wireless communication device jack, the thirty conductors including: at least three video or imaging data conductors; at least three power transmission conductors, each suitable for operation at a voltage different than the others; a pair of audio output conductors; and a pair of line input conductors.

BRIEF DESCRIPTION OF THE SEVERAL VIEWS OF THE DRAWINGS

In the drawings, identical reference numbers identify similar elements or acts. The sizes and relative states of elements in the drawings are not necessarily drawn to scale. For example, the positions of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wireless communication devices such as cellular phones, smartphones, and/or radios have not been shown or described in detail to avoid unnecessarily obscuring descriptions of the embodiments. Additionally, well-known circuits such a pulse output circuits have also not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Although the push-to-talk functionality is described herein with respect to a representative tip-ring-ring-sleeve ("TRRS") configuration, it is readily appreciated by one of ordinary skill in the art that similar configurations of a tip-ring-ring-sleeve connector may be substituted to achieve a similar or a comparable result.

Figure 1:
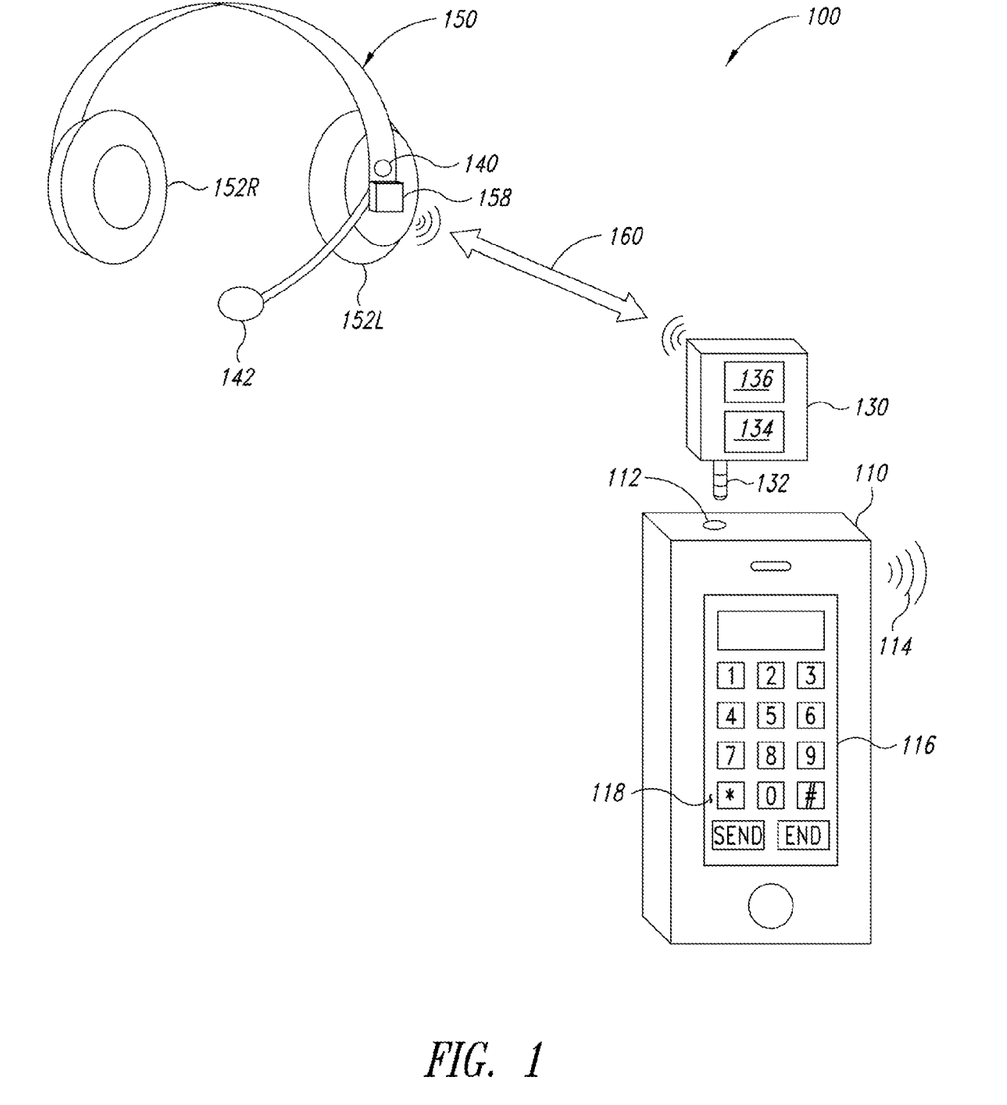
FIG. 1 is a perspective view of an illustrative wireless communication device such as a smartphone operably coupled via an adaptor to a push-to-talk headset that includes two audio output devices, an audio input device, and at least one user actuatable input device, according to one non-limiting illustrated embodiment.

FIG. 1 shows an example wireless communications device 110 operably, communicably, and electrically coupled to an adaptor 130. The adaptor 130 is communicably coupled to a push-to-talk headset system 150. The push-to-talk headset system 150 includes audio output devices 152R and 152L (collectively, "audio output devices 152"), an audio input device 142, a user-actuatable input device 140, and a transceiver 158. In some implementations, the user-actuatable input device 140 permits the push-to-talk headset user to selectively enter and exit a "push-to-talk" mode in which audio input received by the audio input device 142 is communicated by the wireless communication device 110 to one or more external wireless communication devices. The push-to-talk headset transceiver 158 communicably couples 160 to the adaptor 130, facilitating the exchange of audio input signals, audio output signals, and control signals (e.g., signals indicative of user-actuatable input device 142 activation) between the wireless communications device 110 and the push-to-talk headset 150.

The adaptor 130 includes a male plug 132 that physically and operably couples to a corresponding female jack or similar connector 112 on the wireless communication device 110. The coupling of the male plug 132 to the female jack 112 communicably couples the adaptor 130 to the wireless communication device 110. Although depicted as a TRRS plug, the male plug 132 can include a connector having any number of conductors and/or a connector having any shape, style or physical configuration. Thus, at times, the male plug 132 can include a universal serial bus ("USB") or micro-USB connector having a pair of power transmission conductors and a pair of differential data transmission conductors. At times, the male plug 132 can include an 8-conductor Lightning® connector offered by Apple®, Inc. having first and second pairs of differential data transmission conductors, a pair of power transmission conductors, and first and second identification/control conductors associated with the first and second differential data pairs, respectively. At other times, the male plug 132 can include a 30-conductor connector offered by Apple®, Inc. that includes at least at least three video or imaging data conductors, at least three power transmission conductors each at a different voltage, a pair of audio output conductors, and a pair of line input conductors.

The adaptor 130 may include one or more control circuits 134 and one or more communicably coupled transceivers 136. In operation, the transceiver 136 communicates audio information and other data and/or information received from the wireless communication device 110 via the male plug 132 to the push-to-talk headset transceiver 158. In some instances, the transceiver 136 translates the audio information and other data and/or information received from the wireless communication device 110, for example by imposing or otherwise modulating analog or digital audio information on one or more radio frequency carrier waves for transmission to the push-to-talk headset transceiver 158. In some instances, the control circuit 134 may include one or more analog to digital (A/D) converters and/or one or more digital to analog (D/A) converters to convert the audio information received from the wireless communication device 110.

The transceiver 136 also communicates audio information and other data and/or information received from the push-to-talk headset transceiver 158 to the wireless communication device 110 via the male plug 132. In some instances, the transceiver 136 translates the audio information and other data and/or information received from the push-to-talk headset transceiver 158, for example by extracting or otherwise demodulating analog or digital audio information from one or more radio frequency carrier waves received from the push-to-talk headset transceiver 158. In some instances, the control circuit 134 may include one or more analog to digital (ND) converters and/or one or more digital to analog (D/A) converters to convert the audio information received from the push-to-talk headset transceiver 158.

In addition to audio signals, the transceiver 136 may also receive one or more control signals generated by the push-to-talk headset 150. Such control signals may include one or more signals indicative of the push-to-talk headset user's desire to enter a push-to-talk mode in which the wireless communication device 110 transmits 114 any audio input received by the audio input device 142 to one or more other wireless communication devices. The control circuit 134 can convert some or all of such control signals received from the push-to-talk headset to one or more pulse output signals. The control circuit 134 may generate a number of different pulse output signals, each corresponding to a particular control signal received from the push-to-talk headset transceiver 158. For example, a user actuation of the user-actuatable input device 140 may cause the control circuit 134 to generate and communicate a first pulse output signal to the wireless communication device 110. Similarly, a user deactivation or release of the user-actuatable input device 140 may cause the control circuit 134 to generate and communicate a second pulse output signal to the wireless communication device 110. In at least some implementations, the wireless communication device 110 interprets the first pulse output signal as a button "1-click" signal that causes the wireless communication device 110 to transition from a first mode (e.g., a non-push-to-talk mode) to a second mode (e.g., a push-to-talk mode). In at least some implementations, the wireless communication device 110 interprets the second pulse output signal as a button "2-click" signal that causes the wireless communication device 110 to transition from the second mode (e.g., a push-to-talk mode) to the first mode (e.g., a non-push-to-talk mode).

In addition to the aforementioned transceiver 158, the push-to-talk headset system 150 includes any number of audio output devices such as speakers 152R and 152L and one or more audio input devices 142 such as a microphone. One or more user actuatable input devices 140 may be disposed on, or operably coupled to the push-to-talk headset 150. In at least some instances, as shown in FIG. 1 the one or more user actuatable control device 140 may be disposed on or about the push-to-talk headset 150. In other instances, the one or more user actuatable input device 140 may be located remote from the push-to-talk headset 150 and communicably coupled to the push-to-talk headset 150 via a tethered or wireless connection. The one or more user-actuatable input device 140 can include, but is not limited to any current or future developed, mechanical switch, electromechanical switch, capacitive switch, resistive switch, or any combination thereof. In some instances, the one or more user-actuatable control device 140 may include a spring-loaded switch that requires the user to apply a force to the switch to maintain the input device 140 in the second state. In some instances, the one or more user actuatable input devices 140 may include a mechanical locking mechanism that maintains the input device 140 in the second state.

In some instances, a transition of the user-actuatable input device 140 from a first state to a second state causes the transceiver 158 to generate a first control signal that includes information indicative of the change in state of the user-actuatable input device 140. In at least some instances, upon receipt of such a first control signal, the adaptor control circuit 134 can generate and communicate a signal containing a first number of pulses to the wireless communication device 110 via the male plug 132. In some instances, a transition of the user-actuatable input device 140 from the second state to the first state causes the transceiver 158 to generate a second control signal that includes information indicative of the change in state of the user-actuatable input device 140. In at least some instances, upon receipt of such a second control signal, the adaptor control circuit 134 can generate and communicate a signal containing a second number of pulses to the wireless communication device 110 via the male plug 132.

The user-actuatable control device 140 causes the push-to-talk headset transceiver 158 to generate control signals responsive to a received user input. For example, the user-actuatable control device 140 may include a mechanical switch that the push-to-talk headset user presses to place the push-to-talk headset 150 in a push-to-talk mode and releases to remove the push-to-talk headset 150 from the push-to-talk mode. In such an implementation, a user pressing the mechanical switch 140 causes the push-to-talk headset transceiver 158 to generate and communicate a first command signal indicative of the user's desire to initiate a push-to-talk mode. Similarly, a user releasing the mechanical switch 140 causes the push-to-talk headset transceiver to generate a second command signal indicative of the user's desire to terminate the push-to-talk mode. In other implementations, the user-actuatable control device 140 may include one or more voice activated devices. In such an implementation, a user providing a first defined voice command (e.g., "START PUSH-TO-TALK") causes the push-to-talk headset transceiver 158 to generate and communicate a first command signal indicative of the user's desire to initiate a push-to-talk mode. Similarly, a user providing a second defined voice command (e.g., "END PUSH-TO-TALK") causes the push-to-talk headset transceiver 158 to generate and communicate a second command signal indicative of the user's desire to terminate the push-to-talk mode.

The push-to-talk headset system 150 further includes an audio input device 142 such as a microphone or similar transducer capable of directly or indirectly converting an audio input such as sound into an analog or digital electrical signal representative of the audio input. In at least some instances, the audio input device 142 may be positioned proximate a user's mouth when the audio output devices 152 are disposed proximate the user's ears. In at least some instances a second audio input device may be included to provide an audio input to the wireless communications device 110 useful for noise cancellation when the wireless communications device 110 is placed in a push-to-talk mode.

Although the push-to-talk headset system 150 can include any number of audio output devices 152, for clarity and ease of discussion a headset system having a left speaker 152L and a right speaker 152R (e.g., a headset capable of stereophonic output) will be considered for illustrative purposes. Those of ordinary skill in the art will readily appreciate that any number of audio output devices 152, including a monaural single audio output device 152, may be similarly employed. The audio output devices 152 include any system, device, or combination of devices capable of converting one or more analog or digital signals into a human perceptible audio presentation. In at least some instances, the audio output devices 152 may include one or more in-ear loudspeakers (e.g., "earbuds") or one or more over-the-ear loudspeakers (e.g., "cans"). The adaptor 130 communicably couples the push-to-talk headset 150 to the wireless communications device 110.

The wireless communications device 110 can include one or more user output devices 116, for example a display device to provide a user interface 118. The wireless communications device 110 may be disposed at least partially within a housing 120. In at least some instances, the one or more output devices 116 may be disposed such that at least a portion of the one or more user interfaces 118 remain at least partially exposed or user accessible, for example on an exterior surface of the wireless communications device 110. Example wireless communications devices 110 can include, but are not limited to portable telephones, smartphones, personal digital assistants, portable cellular communications devices, portable media players, portable computing devices, portable gaming systems, other portable RF or microwave communication devices, or similar.

The wireless communications device 110 can include any device capable of transmitting and receiving electromagnetic (e.g., radio frequency or "RF") signals carrying or conveying data representative of audio communication, data representative of visual communication, or any combination thereof. One or more user interfaces 118 permitting interaction between a device user and one or more functional aspects of the wireless communications device 110 are provided on at least a portion of the wireless communications device 110. Such user interfaces 118 may include any number or combination of current or future developed user input devices including, but not limited to mechanical pushbuttons or keys, capacitive buttons or keys, resistive buttons or keys, real or virtual keypads, real or virtual keyboards, and the like. In at least some instances, the user interface 118 may include any number or combination of current or future developed pointing devices including but not limited to touchscreens, touchpads, joysticks, and the like.

The wireless communications device 110 may also include one or more output devices 116. The one or more output devices 116 may include any number or combination of audio output devices, visual output devices, haptic output devices, or the like. In at least some instances, all or a portion of the output device 116 and the user interface 118 may be combined to provide input and output functionality, for example one or more touchscreens may be used to provide both input and output functionality. Example audio output devices may include, but are not limited to any current or future developed output technology capable of producing human audible output, such as an electromechanical diaphragm speaker. Example visual output devices may include, but are not necessarily limited to display technologies such as liquid crystal displays ("LCD"), light emitting diode ("LED") displays, organic light emitting diode ("OLED") displays, polymer light emitting diode ("PLED") displays, and the like. Visual output devices may also include indicators, gauges, dials, and the like.

Figure 2:
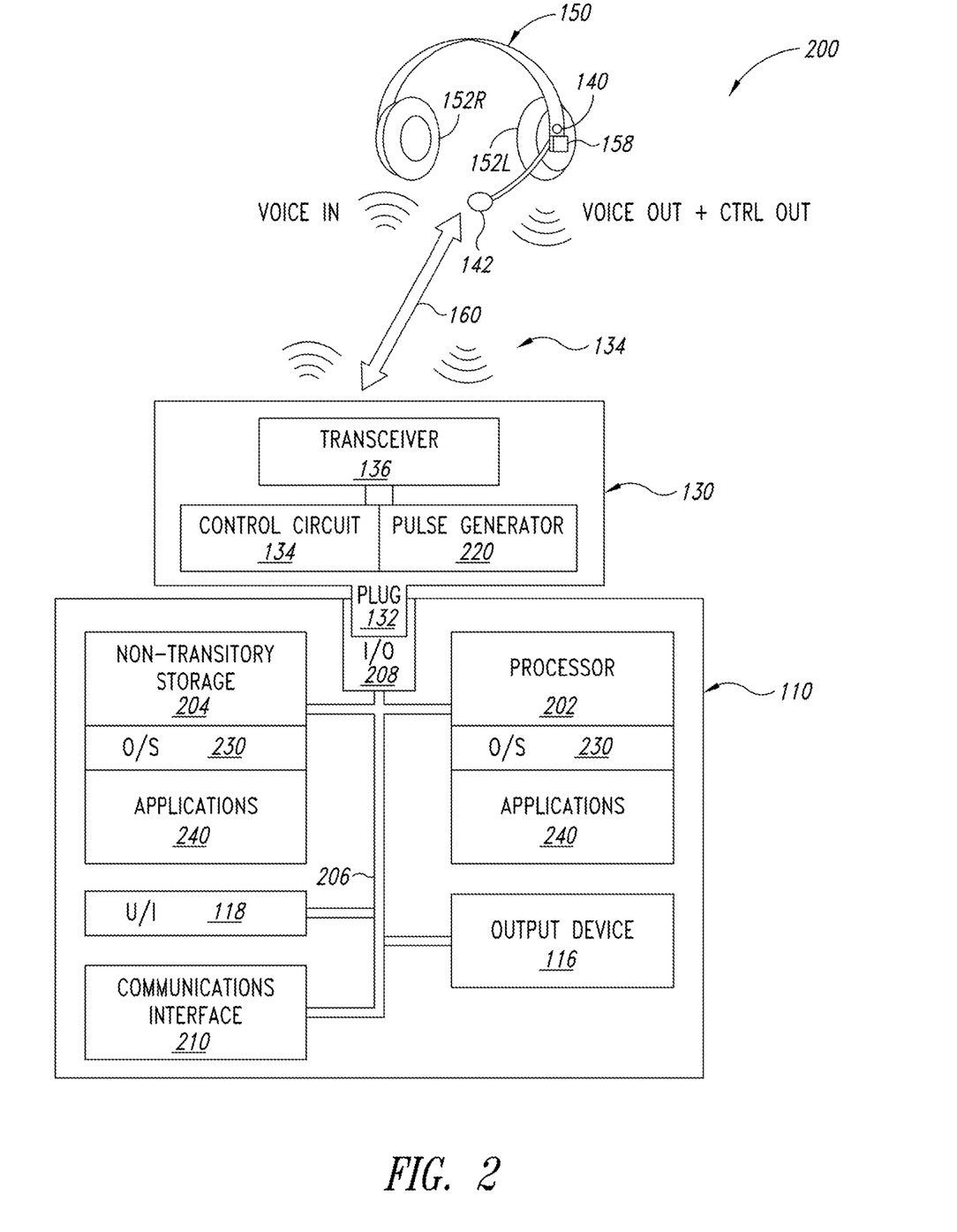
FIG. 2 is a block diagram of the illustrative wireless communication device such as a smartphone and a communicably coupled adaptor that operably couples the wireless communication device to the push-to-talk headset depicted in FIG. 1, according to one illustrated embodiment.

FIG. 2 shows an illustrative system 200 including a wireless communications device 110 operably coupled to an adaptor 130. The adaptor is wirelessly communicably coupled 160 to the push-to-talk headset 150. The push-to-talk headset 150 includes two audio output devices 152, an audio input device 142, and a user-actuatable input device 140. In addition to the output device 116, user interface 118, and input/output ("I/O") interface 208, the wireless communications device 110 also includes a processor 202, a nontransitory storage media 204, and a communications interface 210. In at least some implementations, all or a portion of a processor executable operating system 230 or similar may be stored at least in part within a nontransitory portion of the processor 202. Similarly, in at least some implementations, all or a portion of any number of processor executable applications or "apps" 240 may be stored at least in part within a nontransitory portion of the processor 202. In at least some implementations, all or a portion of a processor executable operating system 230 or similar may be stored at least in part within the nontransitory storage media 204. Similarly, in at least some implementations, all or a portion of any number of processor executable applications or "apps" 240 may be stored at least in part within a nontransitory storage media 204.

The processor 202 can include any number or combination of systems or devices capable of executing one or more sets of machine or processor executable instructions. The processor 202 can include any number of cores or computing devices or machines (e.g., single, dual, or quad core). In at least some instances, the processor 202, nontransitory storage media 204, the output device 116, the user interface 118, and the I/O interface 208 may be bidirectionally communicably coupled via any number of serial or parallel buses 206. Example processors 202 can include, but are not limited to, one or more digital signal processors ("DSP"), one or more application specific integrated circuits ("ASIC"), one or more programmable gate arrays ("PGA"), or combinations thereof. Some or all of the nontransitory storage 204, I/O interface 208, and communications interface 210 may be disposed on one or more common components, for example a System on a Chip ("SoC") package.

The nontransitory storage media 204 can include any number or combination of current or future nontransitory data storage devices. In at least some instances, at least a portion of the nontransitory storage media 204 may be removable from the wireless communications device 110 (e.g., a SIM or micro-secure digital card). The nontransitory storage media 204 may include any number or types of systems, devices or combinations of systems and devices capable of retaining or otherwise storing digital data. Example nontransitory storage media 204 can include, but are not limited to, read only memory ("ROM"), FLASH memory, or electrically erasable programmable read only memory ("EEPROM"), or combinations thereof.

The I/O interface 208 can include any number or combination of current or future wired or wireless I/O interfaces that facilitate the exchange of digital or analog data between the wireless communications device 110 and an external network or device. Example wired I/O interfaces include the female jack 112 or a similar female communications interface or connector that accommodates the coupling of a complimentary male plug 132 communications interface or connector. Such female communications jacks 112 can include, but are not limited to, a TRS or TRRS jack, an Ethernet port, a recognized industry standard interface such as a universal serial bus ("USB"), micro-USB, or IEEE 1394 (Firewire®) interface, or a proprietary interface (e.g., Apple® Lightning®), or the like. Example wireless I/O interfaces can include, but are not limited to a Bluetooth® interface, a near field communication ("NFC") interface, and the like.

The communications interface 210 can include any number or combination of current or future wireless RF interfaces that facilitate the exchange of digital or analog data between the wireless communications device 110 and one or more external wireless communication devices. In at least some implementations, the digital or analog data may include at least in part, voice communication, video communication, or combinations thereof. Example communications interfaces may include, but are not limited to, any current or future developed cellular data transfer technologies such as code division multiple access ("CDMA"), global system for mobile communications ("GSM"), and integrated digital enhanced network ("iDEN"), and the like.

Any current or future mobile or desktop operating system such as Windows 8® by Microsoft®, iOS® 7 by Apple®, Android® by Google®, Blackberry OS® by BlackBerry® Ltd., or similar may be executed by the at least one processor 202. In at least some instances, the operating system 230 can monitor and control some or all of the communication and exchange of data between the wireless communications device 110 and the adaptor 130. In at least some instances, the operating system 230 executed by the processor 202 can alter, adjust or control one or more operational aspects of the wireless communications device 110 based at least in part on the presence or absence of the adaptor 130. For example, the operating system 230 may detect the communicable coupling of the adaptor 130 to the TRRS jack 112 and adjust one or more portable electronic device parameters (e.g., disrupt an audio signal to an on-board audio output device in the portable electronic device) responsive to detecting the communicable coupling of the adaptor 130. In some instances, the operating system 230 may call the processor 202 to execute one or more applications 240 or "apps" stored in the nontransitory storage media 204 responsive to detecting the communicable coupling of the adaptor 130 to the TRRS jack 112.

In other instances, at least a portion of one or more applications 240 may be intermittently or continuously executed by the processor 202 at or under the direction of the operating system 230. In at least some instances, such applications 240 may interface with the operating system 230 (i.e., unidirectionally or bidirectionally transfer data to/from) via one or more application program interfaces ("APIs") or any similar electronic data transfer interface. In such instances, the operating system 230 may pass data indicative of the communicable coupling of the adaptor 130 to the TRRS jack 112 to the application 240 via the API. Responsive to the receipt of the indication of a communicably coupled adaptor 130, the operating system 230, the application 240, or some combination thereof may functionally and operationally provide push-to-talk functionality with one or more external wireless communication devices via the communications interface 210. Such push-to-talk functionality may be provided for example by opening a half- or full-duplex radio frequency voice communication channel via the communications interface 210 when one or more defined events occur using the push-to-talk headset 130 (e.g., when a user-actuatable input device 140 transitions from a first state to a second state).

The control circuit 134 in the adaptor 130 can include at least one pulse generator circuit 220 capable of generating a pulsed output signal communicated to the wireless communication device 110 via the male plug 132. At times, such pulsed output signals are perceptible to at least one of the device operating system 230 or an application 240 executed by the device processor 202. The output signal provided by the pulse generator circuit 220 can include any defined number of pulses having any defined duration occurring any defined frequency or interval. The output signal generated by the pulse generator circuit 220 can include any pulsed signal detectable by the operating system 230 or by an application 240 executed by the processor 202. In at least some instances, each of the pulses in the pulsed output signal provided by the pulse generator circuit 220 may be interpreted by the operating system 230 as representative of one or more "button click" events. Such button click events may be used by the operating system 230 or one or more applications 240 to provide one or more features or functionalities on the wireless communications device 110. For example, a first pulsed output signal can correspond to a "1-click" button event (e.g., an event where a switch is transitioned from a first state to a second state). Similarly, a second pulsed output signal can correspond to a "1-click" button event (e.g., an event where a switch is transitioned from a first state to a second state twice within a defined time period).

Responsive to the full or partial actuation, displacement, or transition of the user-actuatable input device 140 from a first state (e.g., RAISED) to a second state (e.g., DEPRESSED), the push-to-talk headset transceiver 158 generates and transmits 160 one or more control signals indicative of the actuation to the adaptor transceiver 136. Responsive to the receipt of the control signal by the adaptor transceiver 136, the control circuit 134 causes the pulse generator circuit 220 to generate and communicate to the wireless communications device 110 a signal including a first number of pulses. In at least some instances, the operating system 230 of the wireless communications device 110 detects the signal including the first number of pulses as a single button click event.

Responsive to the full or partial actuation, displacement, or transition of the user-actuatable input device 140 from the second state (e.g., DEPRESSED) to the first state (e.g., RAISED), the push-to-talk headset transceiver 158 generates and transmits 160 one or more control signals indicative of the actuation to the adaptor transceiver 136. Responsive to the receipt of the control signal by the adaptor transceiver 136, the control circuit 134 causes the pulse generator circuit 220 to generate and communicate to the wireless communications device 110 a signal including a second number of pulses. In at least some instances, the operating system 230 of the wireless communications device 110 detects the signal including the second number of pulses as a double button click event (i.e., two clicks of the user-actuatable input device 140 within a defined timeframe).

In at least some implementations, receipt of the first signal by the operating system 230 may cause the operating system 230 or an application 240 executed by the processor 202 to perform an action such as placing the wireless communication device 110 in a push-to-talk mode. In at least some implementations, receipt of the second signal by the operating system 230 may cause the operating system 230 or an application 240 executed by the processor 202 to perform an action such as placing the wireless communication device 110 in a non-push-to-talk mode.

Figure 3A:
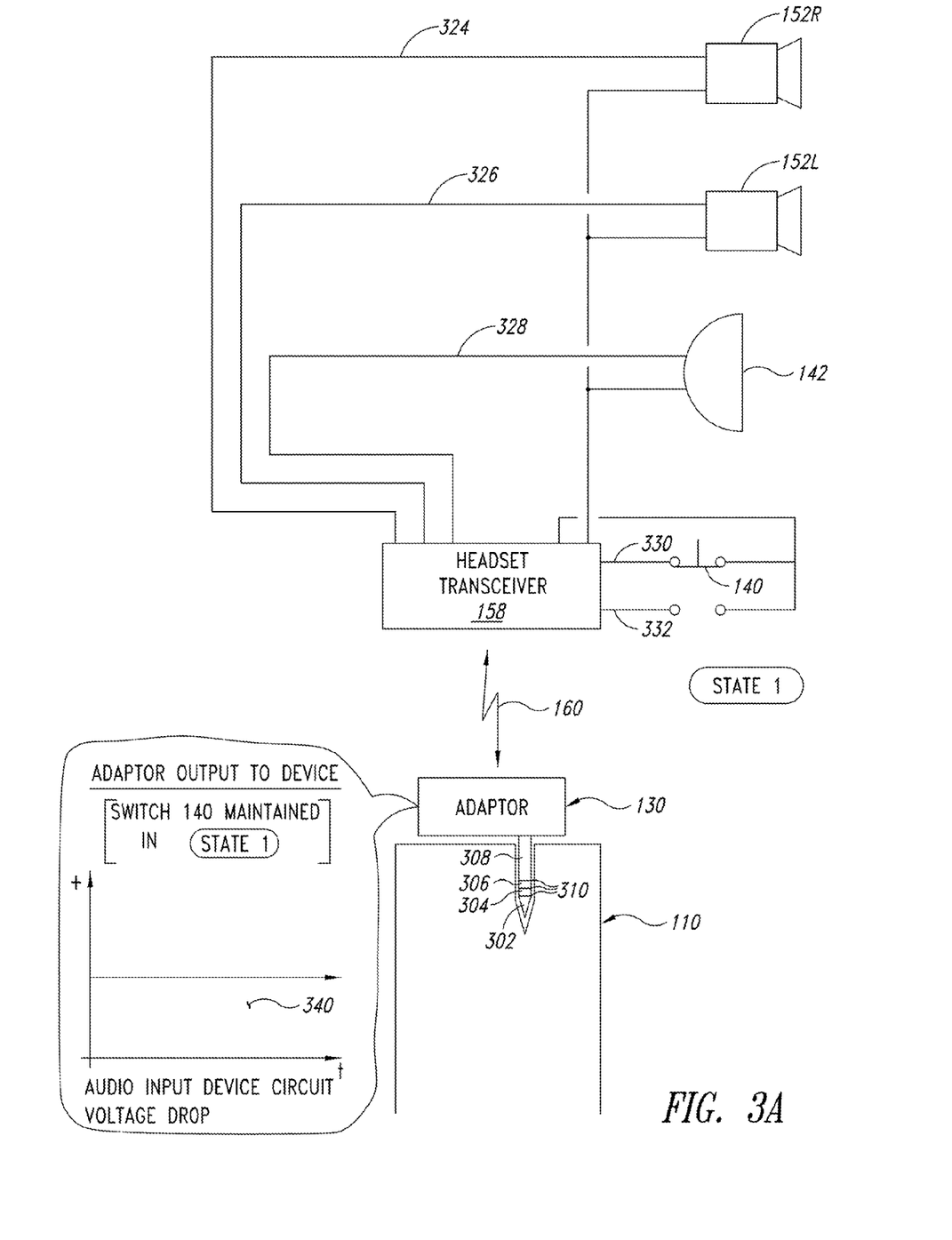
FIG. 3A is a schematic diagram of a push-to-talk headset system including a headset equipped with a transceiver and at least one user actuatable input device (a push-to-talk switch) and an adaptor equipped with a pulse generation circuit, according to one illustrated embodiment.

FIG. 3A shows a push-to-talk headset system 150 prior to user actuation of a user-actuatable input device 140 (i.e. a "push-to-talk" switch), according to one illustrated embodiment. Also depicted in FIG. 3A is an illustrative plot 340 of an example pulse generator circuit 220 output showing audio input circuit (i.e., microphone circuit) voltage as a function of time at the male plug 132 (e.g., between the sleeve of a TRRS plug and the ground ring on a TRRS plug). Plot 340 depicts a constant high impedance audio input circuit to the wireless communications device 110.

Figure 3B:
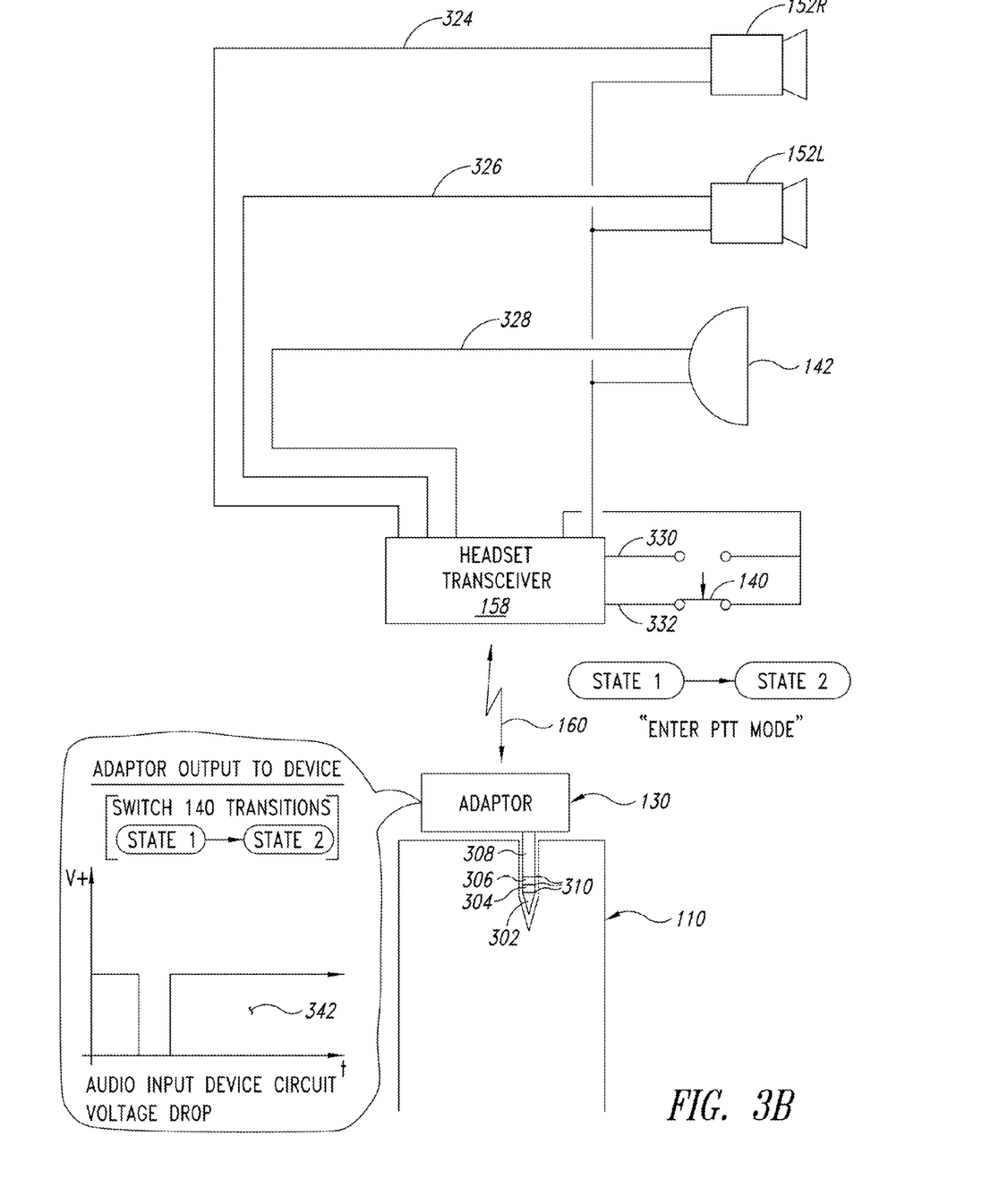
FIG. 3B is a schematic diagram of the push-to-talk headset system including the at least one headset user actuatable input device transitioning from a first state to a second state (i.e., entering a push-to-talk mode), along with an accompanying plot of voltage against time showing a pulsed first signal generated by the adaptor pulse generator circuit, according to one illustrated embodiment.

FIG. 3B shows a push-to-talk headset system 150 upon user actuation (e.g., PRESS) and transition of the user-actuatable input device 140 from a first state (e.g., PUSH-TO-TALK DISABLED) to a second state (e.g., PUSH-TO-TALK ENABLED), according to one illustrated embodiment. Also depicted in FIG. 3B is an illustrative plot 342 of an example pulse generator circuit 220 output showing audio input circuit (i.e., microphone circuit) voltage as a function of time at the male plug 132 (e.g., between the sleeve of a TRRS plug and the ground ring on a TRRS plug). Plot 342 depicts a momentary or temporally transitory single pulse comprising a low impedance circuit or electrical short (i.e., zero (0) voltage drop) in the audio input circuit to the wireless communications device 110.

Figure 3C:
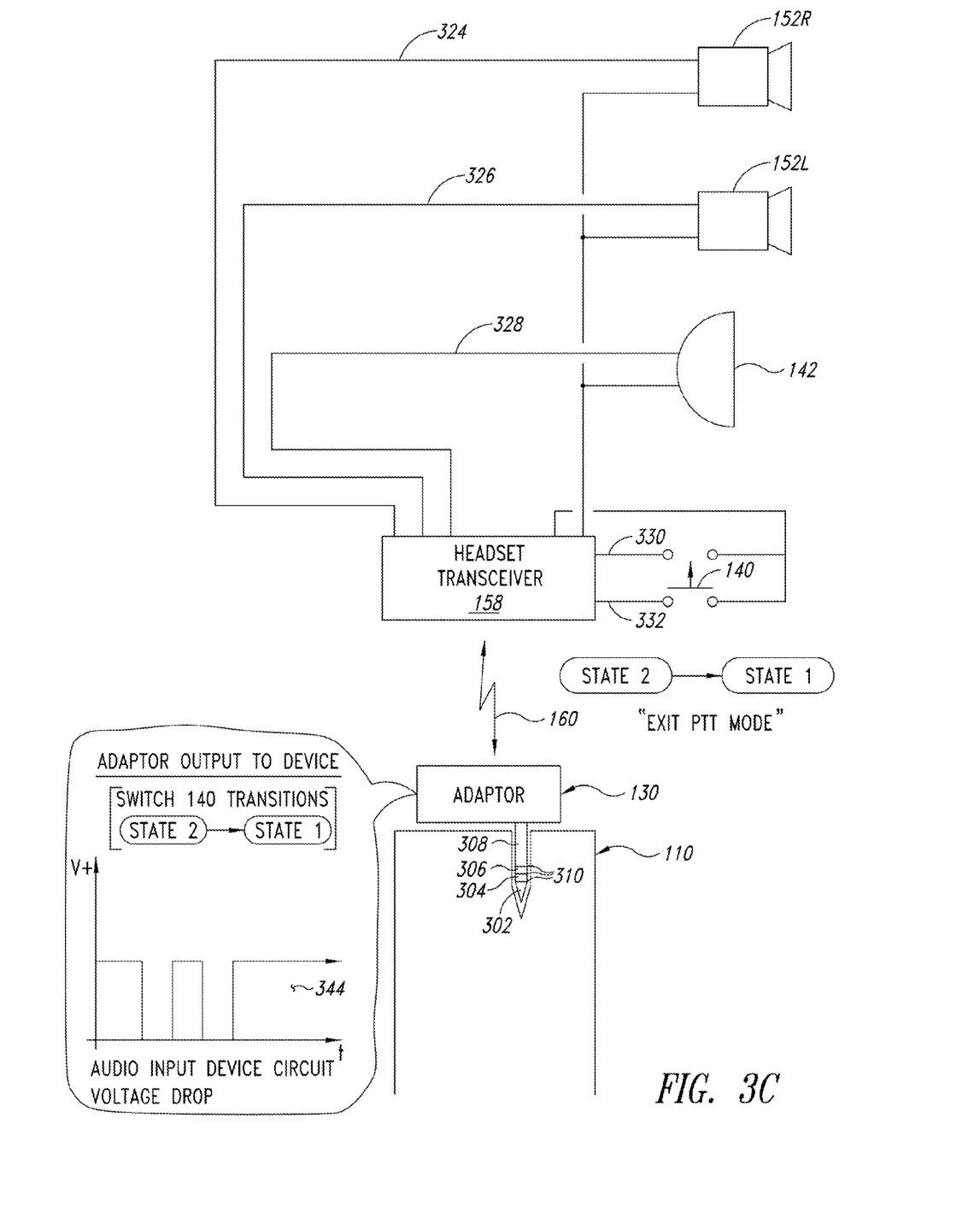
FIG. 3C is a schematic diagram of the push-to-talk headset system including the at least one headset user actuatable input device transitioning from the second state to the first state (i.e., exiting a push-to-talk mode), along with an accompanying plot of voltage against time showing a pulsed second signal generated by the adaptor pulse generator circuit, according to one illustrated embodiment

FIG. 3C shows a push-to-talk headset system 150 upon user actuation (e.g., RELEASE) and transition of the user-actuatable input device 140 from the second state (e.g., PUSH-TO-TALK ENABLED) to the first state (e.g., PUSH-TO-TALK DISABLED), according to one illustrated embodiment. Also depicted in FIG. 3C is an illustrative plot 344 of an example pulse generator circuit 220 output showing audio input circuit (i.e., microphone circuit) voltage as a function of time at the male plug 132 (e.g., between the sleeve of a TRRS plug and the ground ring on a TRRS plug). Plot 344 depicts two momentary or temporally transitory single pulses comprising a low impedance circuit or electrical short (i.e., zero (0) voltage drop) in the audio input circuit separated by a transitory high-impedance circuit in the audio input circuit to the wireless communications device 110.

Although illustrated as a TRRS male plug 132 in FIGS. 3A-3C for clarity and ease of discussion, similar pulsed signals or the functional equivalent thereof may be provided via other previously disclosed male plugs 132. For example, a low-impedance audio input circuit pulse (or the equivalent thereof) may be provided via a USB or micro-USB male plug 132. As shown in FIGS. 3A-3C, the TRRS plug 150 can include a number of conductive surfaces including a tip 302, a first ring 304, a second ring 306, and a sleeve 308 each physically separated and electrically isolated from the other by one or more insulators 310.

FIG. 3A depicts an adaptor 130 communicably coupled 160 to the push-to-talk headset transceiver 158. The adaptor 130 is thus able to receive one or more control signals generated responsive to the actuation of one or more user-actuatable input devices 140 coupled to the push-to-talk headset 150. The adaptor 130 is communicably coupled to the wireless communication device 110 via the male plug 132. As depicted in FIGS. 3A-3C, in at least some implementations, the male plug 132 can include a tip-ring-ring-sleeve or TRRS connector.

The TRRS connector includes a conductive, cylindrical shaped, segmented, shaft extending from a larger, non-conductive, body facilitating manipulation of the connector by a user. The TRRS connector obtains its name from the structure of the conductive shaft which contains a tip 302, a first ring 304, a second ring 306, and a sleeve 308. To electrically isolate the tip 302, first ring 304, second ring 306, and sleeve 308 from each other, isolators 310 are disposed between the tip 302, the first ring 304, the second ring 306, and the sleeve 308 on the TRRS plug.

The shaft of the tip-ring-ring-sleeve plug 150 can be of any available dimension, with diameters of 3.5 mm (approx. ⅛") and 2.5 mm (approx. ³⁄₃₂") being used for many compact wireless communications devices 110 such as smartphones. In some instances, larger shafts, for example a ¼" diameter shaft, may also be used. Each of the tip 302, first ring 304, second ring 306 and sleeve 308 is formed of an electrically conductive material, brass and aluminum being but two of many example conductive materials amenable for use as a tip-ring-ring-sleeve plug 150. Electrically non-conductive materials (i.e., insulators) 310 are disposed to electrically isolate the tip 302, the first ring 304, the second ring 306 and the sleeve 308 from each other.

In some implementations, the user-actuatable input device 140 may include a double pole, single throw, switch momentary, normally-closed, switch capable of a user-actuatable, selective, displacement between a first state (depicted in FIG. 3A) in which a first push-to-talk circuit 330 provides an input to the headset transceiver 158, and a second state (depicted in FIG. 3B) in which a second push-to-talk circuit provides an input to the headset transceiver 158. In at least some implementations, one or more mechanical, electrical, or electromechanical latches or locks may be operably coupled to the user-actuatable input device 140 to maintain the input device 140 in the first state or in the second state without requiring the user to hold the input device 140 in the desired state.

When the user-actuatable input device 140 transitions from a first state to a second state, the push-to-talk headset transceiver 158 communicates one or more signals that include data representative of the user-actuatable input device's change from the first state to the second state. In at least some instances, the pulse generator circuit 220 generates and communicates a signal including a first number of pulses to the wireless communications device 110 responsive to the receipt of such a signal from the push-to-talk headset receiver 158.

When the user-actuatable input device 140 transitions from the second state to the first state, the push-to-talk headset transceiver 158 communicates one or more signals that include data representative of the user-actuatable input device's change from the second state to the first state. In at least some instances, the pulse generator circuit 220 generates and communicates a signal including a second number of pulses to the wireless communications device 110 responsive to the receipt of such a signal from the push-to-talk headset transceiver 158.

Referring now to FIG. 3B, the pulse generator circuit 220 generates a first signal including a number of pulses responsive to receiving a signal from the push-to-talk headset transceiver 158 indicative of a transition of the user-actuatable input device 140 from the first state to the second state. Such a transition from the first state to the second state may correspond to a user DEPRESSING the user actuatable input device 140 to place the push-to-talk headset 150 in the push-to-talk mode. The number of pulses generated responsive to detecting a transition from the first state to the second state can include any number of pulses such as: one or more pulses; five or more pulses; or ten or more pulses. Where the first signal includes multiple pulses, each pulse in the first signal may be temporally separated from the other pulses in the second signal by a duration of about 100 milliseconds (mS) or less; about 150 mS or less; about 200 mS or less; about 300 mS or less; or about 400 mS or less.

In at least some instances, the first signal can include a single pulse created by completing a momentary or similar transitory low impedance circuit of a defined first duration between the headset audio-input circuit 328 and ground. The first duration can be about 100 milliseconds (mS) or less; about 150 mS or less; about 200 mS or less; about 300 mS or less; or about 400 mS or less. The first signal is detectable by the operating system 230 or application 240 executed by the wireless communications device 110.

In at least some instances, responsive to receipt of the first signal from the pulse generator circuit 220, the operating system 230 can send a notification (e.g., an interrupt or similar) indicative of the received first signal to a push-to-talk application 240 executed by the wireless communication device processor 202. Responsive to the notification generated by the receipt of the first signal by the operating system 230, the application 240 can place the wireless communications device 110 in a push-to-talk mode in which a half- or full-duplex communication channel is established between the wireless communications device 110 and one or more external wireless communication devices.

Referring now to FIG. 3C, the pulse generator circuit 220 generates a second signal including a number of pulses responsive to detecting a signal from the push-to-talk headset transceiver 158 indicative of a transition of the user-actuatable input device 140 from the second state to the first state. Such a transition from the second state to the first state may correspond to a user RELEASING the user actuatable input device to remove the push-to-talk headset 150 from the push-to-talk mode. The number of pulses generated responsive to detecting a transition from the second state to the first state may be the same or different than the number of pulses generated responsive to detecting a transition from the first state to the second state and may include any number of pulses such as: two or more pulses; five or more pulses; or ten or more pulses. Where the second signal includes multiple pulses, each pulse in the second signal may be temporally separated from the other pulses in the second signal by a duration of about 100 milliseconds (mS) or less; about 150 mS or less; about 200 mS or less; about 300 mS or less; or about 400 mS or less.

In at least some instances, the second signal can include two pulses created by completing two momentary or similar transitory low impedance electrical circuits of a defined second duration between the audio-input circuit 328 and ground. The second duration can be about 100 milliseconds (mS) or less; about 150 mS or less; about 200 mS or less; about 300 mS or less; or about 400 mS or less. The second signal is detectable by the operating system 230 or application 240 executed by the wireless communications device 110.

In at least some instances, responsive to receipt of the second signal from the pulse generator circuit 220, the operating system 230 can send a notification (e.g., an interrupt or similar) indicative of the received second signal to a push-to-talk application 240 executed by the wireless communications device processor 202. Responsive to the notification generated by the receipt of the second signal by the operating system 230, the application 240 can remove the wireless communications device 110 from the push-to-talk mode.

Note that although described above in terms of a PRESS event and a RELEASE event using a single user-actuatable input device 140 disposed on the push-to-talk headset 150, any number of user-actuatable devices 140a-140n may be substituted. For example, a push-to-talk headset 150 may include a first user-actuatable input device 140a actuatable to enter push-to-talk mode and a second user-actuatable input device 140b actuatable to exit push-to-talk mode.

Figure 4:
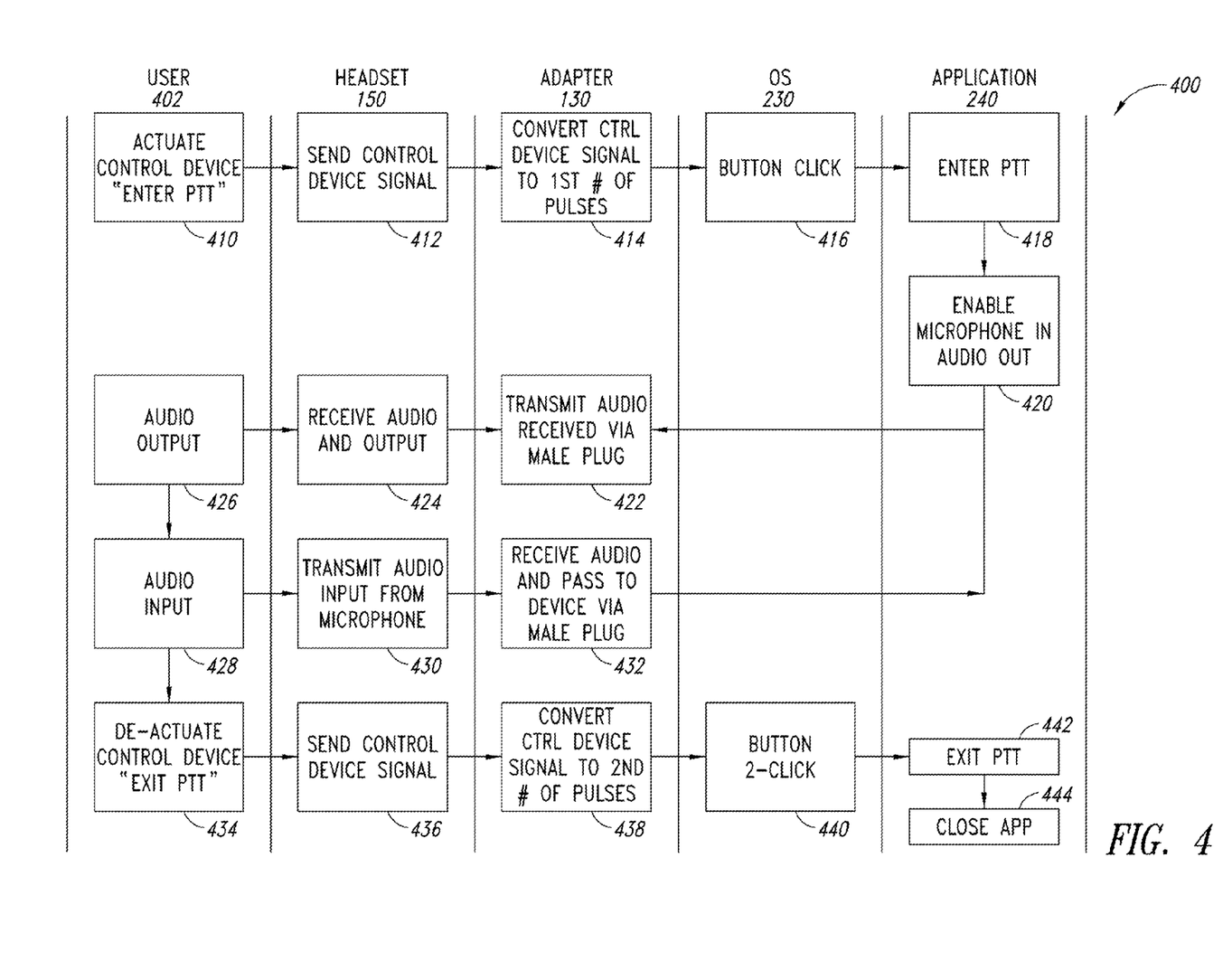
FIG. 4 is a high level flow diagram of an example push-to-talk session using a wireless communication device operably and communicably coupled to a push-to-talk headset as depicted in FIG. 1, according to one illustrated embodiment.

FIG. 4 shows a logic flow 400 of an illustrative push-to-talk session using a wireless communications device 110 communicably coupled via an adapter 130 to a push-to-talk headset 150 such as that described in detail above, according to one or more embodiments. The push-to-talk session occurs as the result of interaction between a user 402, the push-to-talk headset 150, the adaptor 130, the portable electronic device operating system 230, and an application 240 executed by the wireless communication device processor 202. Such interaction can advantageously provide push-to-talk capability on wireless communications devices 110 that are not equipped with native push-to-talk capabilities.

At 410, to indicate a desire for the wireless communication device 110 to ENTER the push-to-talk mode, a user actuates the user-actuatable input device 140 on the push-to-talk headset 150. Such actuation may include transitioning or physically displacing (e.g., DEPRESSING) a mechanical push-to-talk switch 140 from a first state to a second state or may include changing the electrically conductive state of a capacitive or resistive switch 140 from a first electrically conductive state to a second electrically conductive state. The use of sealed or otherwise water and/or dust tight switches may advantageously enable the use of the push-to-talk headset 150 in environments traditionally considered hostile to electronic devices, for example environments where water, dirt, heat, etc. may be present. Additionally, the use of a sealed or otherwise explosion proof push-to-talk switch 140 may permit the use of the push-to-talk headset 150 in hazardous or other electrically classified areas.

At 412, responsive to the user actuating the push-to-talk switch 140 from the first state to the second state, the push-to-talk headset transceiver 158 generates and communicates one or more signals that include data indicative of the displacement of the push-to-talk switch 140 from the first state to the second state. Such signals may include analog data, digital data, or any combination of analog and digital data. In at least some instances, such signals may be communicated wirelessly in the industrial, scientific, and medical (ISM) radio frequency band of from about 2400 megahertz (MHz) to about 2480 MHz.

At 414, the adaptor transceiver 136 receives the signal including data indicative of the displacement of the push-to-talk switch 140 from the first state to the second state generated and communicated by the push-to-talk headset transceiver 158. Responsive to the receipt of the signal, the adaptor control circuit 134 generates the first signal that includes a first number of pulses. The adaptor 130 communicates the first signal to the wireless communication device operating system 230 via the male plug 132.

For example, responsive to the receipt of a signal indicative of a desire to place the push-to-talk headset 150 in push-to-talk mode, the adaptor control circuit 136 may generate a first signal that includes a single pulse having a duration of approximately 200 mS. The adaptor 130 provides the pulse as 200 mS temporally transient low impedance electrical circuit between the TRRS plug 132 audio input circuit 328 and ground.

At 416, the operating system 230 of the wireless communications device 110 receives the first signal via the jack 112 and I/O interface 208. In at least some instances, the operating system 230 can interpret each of the pulses contained in the first signal as a respective "button-click event." For example, the operating system 230 can interpret the single 200 mS duration pulse generated by the adaptor control circuit 134 at 414 as a single "button-click" event. Responsive to detecting the "1-click" event, the operating system 230 communicates a notification indicative of the received "1-click" event to a push-to-talk application 240 executed by the wireless communication device processor 202.

At 418, responsive to receipt of the "1-click" event notification from the operating system 230, the push-to-talk application 240 can place the wireless communication device 110 in the push-to-talk mode.

At 420, the push-to-talk application 240 enables the continuous broadcast of audio input supplied by the user via the one or more push-to-talk headset audio input devices 142. The push-to-talk application 240 further enables the continuous delivery of incoming or received audio data to the user via the push-to-talk headset audio output devices 152.

At 422, the wireless communication device 110 communicates audio data received from one or more external wireless communication devices to the adaptor 130 via the I/O interface 208, the TRRS jack 112 and the TRRS plug 132. The adaptor 130 transmits the received audio data to the push-to-talk headset 150. In at least some instances, the adaptor 130 may translate or otherwise modulate the audio data on one or more carrier waves for transmission to the push-to-talk headset 150. In some instances, the adaptor 130 may convert the audio data received from the wireless communications device 110. For example, the adaptor may convert analog audio data received from the wireless communication device 110 to digital data for transmission by the adaptor transceiver 136 to the push-to-talk headset 150 using one or more analog to digital ("A/D") converters. In another example, the adaptor may convert digital audio data received from the wireless communication device 110 to analog data for transmission by the adaptor transceiver 136 to the push-to-talk headset 150 using one or more digital to analog ("D/A") converters.

In some instances, the adaptor 130 modifies and/or converts the audio signal prior to transmission to the push-to-talk headset 150. For example, the adaptor may employ one or more noise reduction algorithms to the audio signal prior to transmission by the adaptor transceiver 136 to the push-to-talk headset 150.

The external wireless communication devices can include, but are not limited to, one or more stationary or semi-stationary electronic devices such as a base station or a vehicle mounted electronic device, one or more portable electronic devices, or combinations thereof. The communication between the push-to-talk headset and the external electronic devices may include half- or full-duplex communications. In at least some instances, the wireless communications device 110 remains in the push-to-talk mode as long as the user maintains the push-to-talk switch 140 in the second state.

At 424, the push-to-talk headset transceiver 158 receives the audio data transmitted by the adaptor 130 at 422. In at least some instances, the push-to-talk headset transceiver 158 may translate or otherwise demodulate the audio data received from the adaptor transceiver 136. In some instances, the push-to-talk headset transceiver 158 may convert the audio data received from the adaptor transceiver 136. For example, the push-to-talk headset transceiver 158 may convert digital audio data received from the adaptor transceiver 136 to analog data for output by the one or more audio output devices 152 using one or more digital to analog ("D/A") converters.

At 426, the push-to-talk headset transceiver 158 communicates the received (an optionally demodulated and/or converted) audio data to the one or more audio output devices 152.

At 428, the user provides an audio input to the one or more push-to-talk headset audio input devices 142. The one or more audio input devices 142 convert the audio input to analog or digital audio input data. For example, an audio input device 142 such as a piezoelectric microphone may convert the audio input provided by the user into an analog audio input signal.

At 430, the push-to-talk headset transceiver 158 transmits the audio input signal received from the one or more audio input devices 142 to the adaptor transceiver 136. In at least some instances, the push-to-talk headset transceiver 158 may translate or otherwise modulate the audio input data on one or more carrier waves for transmission to the adaptor transceiver 136. In some instances, the push-to-talk headset transceiver 158 may convert the audio input data received from the one or more audio input devices 142. For example, the push-to-talk headset transceiver 158 may convert analog audio data received from the one or more audio input devices 142 to digital data for transmission to the adaptor transceiver 136 using one or more analog to digital ("ND") converters.

In some instances, the push-to-talk headset transceiver 158 modifies and/or converts the audio input signal prior to transmission to the adaptor transceiver 136. For example, the push-to-talk headset transceiver 158 may employ one or more noise reduction algorithms or noise cancellation algorithms to the audio input signal prior to transmission by the push-to-talk headset transceiver 158 to the adaptor transceiver 136.

At 432, the adaptor transceiver 136 receives the audio input signal transmitted by the push-to-talk headset transceiver 158 at 430. In at least some instances, the adaptor transceiver 130 may translate or otherwise demodulate the audio input signal received from the push-to-talk headset transceiver 158 to retrieve all of a portion of the original analog or digital audio input data provided by the one or more push-to-talk headset audio input devices 142. In some instances, the adaptor transceiver 136 may convert the audio input data received from the push-to-talk headset transceiver 158. For example, the adaptor transceiver 136 and/or control circuit 134 may convert digital audio input data received from the push-to-talk headset transceiver 158 to analog audio input data using one or more digital to analog ("D/A") converters. The adaptor 130 can transmit the analog audio input data to the wireless communication device 110 via the TRRS plug 132, the TRRS jack 112, and the I/O interface 208. output by the one or more audio output devices.

In some instances, the adaptor transceiver 136 and/or the adaptor control circuit 134 modifies and/or converts the audio input signal prior to transmitting the audio input signal to the wireless communication device 110. For example, the adaptor transceiver 136 and/or the adaptor control circuit 134 may employ one or more noise reduction algorithms or noise cancellation algorithms to the audio input signal prior to transmission to the wireless communication device 110. In at least some instances, the adaptor 130 may perform such noise cancellation or reduction using one or more secondary or ambient audio inputs received by the adaptor 130.

At 434, to indicate a desire for the wireless communication device to EXIT push-to-talk mode, the user actuates the push-to-talk switch 140 on the push-to-talk headset 150. Such actuation may include transitioning or physically displacing (e.g., RELEASING) a mechanical push-to-talk switch 140 from the second state to the first state or may include changing the electrically conductive state of a capacitive or resistive switch from the second electrically conductive state to the first electrically conductive state.

At 436, responsive to the user actuating the push-to-talk switch 140 from the second state to the first state, the push-to-talk headset transceiver 158 generates and communicates one or more signals that include data indicative of the displacement of the push-to-talk switch 140 from the second state to the first state. Such signals may include analog data, digital data, or any combination of analog and digital data. In at least some instances, such signals may be communicated wirelessly in the industrial, scientific, and medical (ISM) radio frequency band of from about 2400 megahertz (MHz) to about 2480 MHz.

At 438, the adaptor transceiver 136 receives the signal including data indicative of the displacement of the push-to-talk switch 140 from the second state to the first state generated and communicated by the push-to-talk headset transceiver 158. Responsive to the receipt of the signal, the adaptor control circuit 134 generates a second signal that includes a second number of pulses. The adaptor 130 communicates the second signal to the wireless communication device operating system 230 via the male plug 132, the jack 112, and the I/O interface 208.

For example, responsive to the receipt of a signal indicative of a desire to remove the push-to-talk headset 150 from the push-to-talk mode, the adaptor control circuit 136 may generate a second signal that includes two pulses, each pulse having a duration of approximately 200 mS, separated by a duration of approximately 200 mS. The adaptor control circuit 134 provides each of the pulses as 200 mS temporally transient low impedance electrical circuit between the TRRS plug 132 audio input circuit 328 and ground. The adaptor control circuit 134 provides the separation between the pulses as a 200 mS temporally transient high impedance electrical circuit between the TRRS plug 132 audio input circuit 328 and ground.

At 440, the operating system 230 of the wireless communications device 110 receives the second signal via the jack 112 and I/O interface 208. In at least some instances, the operating system 230 can interpret each of the pulses contained in the second signal as a respective "button-click event." For example, the operating system 230 can interpret each of the two 200 mS duration pulses in the second signal generated at 424 as a single "2-click" event. Responsive to detecting the "2-click" event, the operating system 230 can communicate a notification indicative of the received "2-click" event to the push-to-talk application 240 executed by the wireless communication device operating system 230.

At 442, responsive to receipt of the "2-click" event notification from the operating system 230, the push-to-talk application 240 can remove the wireless communication device 110 from push-to-talk mode.

At 444, responsive to receipt of the "2-click" notification, the application 240 may optionally cease execution in part or in full.

Although illustratively described above in the context of a battery powered portable electronic device, embodiments incorporating one or more electro-mechanical relays or solid state control circuits may also be implemented. Such implementations may be powered using the smartphone internal battery, the smartphone external power supply, power supplied via an external source, or any combination thereof.

Although described in the context of portable electronic devices, the systems, apparatus and methods described herein are not limited to portable electronic devices and are equally applicable to any headset system using any size tip-ring-ring-sleeve connector. Example, non-limiting headset systems include, aviation headset systems, gaming headset systems, commercial headset systems, first responder and emergency services headset systems, military headset systems, broadcast headset systems, and the like.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Patent Publication No. US 2013/0195283 A1, filed Feb. 1, 2012 and published Aug. 1, 2013; U.S. Provisional Patent Application No. 61/624,204, filed Apr. 13, 2012; and U.S. patent application Ser. No. 13/795,524, filed Mar. 12, 2013 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An audio jack adaptor for a wireless communications device to enable push-to-talk, PTT, functionality between an audio input/output wireless accessory device and the wireless communications device, the adaptor comprising:
 a housing;
 a male plug coupled to the housing, the male plug sized, dimensioned and configured to be received by the audio jack, the male plug further comprising an audio input signal line for providing audio received from the wireless accessory device to the wireless communication device via the audio jack;
 a wireless transceiver at least partially housed by the housing; and
 a control circuit at least partially housed by the housing, the control circuit configured to:
  responsive to receipt of a signal from the wireless accessory device indicative of an activation of a PTT input switch transitioning the switch from a deactivated state to an activated state, transmit one or more pulses to the wireless communication device via the male plug by momentarily grounding the audio input signal line to create each pulse to indicate the transition of the PTT input switch to the activated state.

2. The audio jack adaptor of claim 1, wherein the control circuit is further configured to, responsive to detecting the activation of the PTT input switch, generate and communicate via the male plug a first number of pulses, each pulse comprising a low impedance electrical connection to ground for at least a first duration and each pulse separated from another pulse by a high impedance electrical connection for at least a second duration.

3. The audio jack adaptor of claim 2, wherein the control circuit is further configured to, responsive to detecting a signal from the wireless accessory device indicative of a deactivation of the PTT input switch transitioning from the activated state back to the deactivated state, generate and communicate via the male plug a second number of pulses and, while the PTT input switch remains deactivated, terminate transmission of signals via the male plug to the wireless communications device.

4. The audio jack adaptor of claim 1, wherein the control circuit is further configured to translates signals received via the male plug and transmit the translated signals via the wireless transceiver to the wireless accessory device.

5. The audio jack adaptor of claim 1, wherein the male plug includes a plurality of distinct, electrically conductive, segments spaced along a length thereof.

6. The audio jack adaptor of claim 5, wherein the male plug (is a tip-ring-ring-sleeve, TRRS, plug.

7. The audio jack adaptor of claim 5, wherein the male plug is a 3.5 mm male plug and is the only male plug on the adaptor.

8. The audio jack adaptor of claim 7, wherein the adaptor omits any female communications ports.

9. The audio jack adaptor of claim 1, wherein the male plug comprises a serial communications interface consisting of at least four conductors, the four conductors consisting of:
 a pair of power transmission conductors; and
 a pair of differential data transmission conductors.

10. The audio jack adaptor of claim 1, wherein responsive to detecting activation of the PTT input switch, the control circuit transmits a first number of pulses to the wireless communication device, each pulse comprising a low impedance electrical connection to ground for at least a first duration and each pulse separated from another pulse by a high impedance electrical connection for at least a second duration; and wherein, responsive to detecting deactivation of the PTT input switch, the control circuit transmits a second number of pulses to the wireless communication device different from the first number of pulses.

11. A system for use with a wireless communications device having an audio jack, the system comprising:
 a wireless accessory device having at least one wireless transceiver, a microphone, a speaker, and an operably coupled PTT input switch;
 an audio jack adaptor, the adapter comprising:
  a housing;
  a male plug sized, dimensioned and configured to be received by the wireless communications device audio jack, the male plug further comprising an audio input signal line for providing audio received from the wireless accessory device to the wireless communication device via the audio jack;

a wireless transceiver; and a control circuit configured to responsive to receipt of a signal from the indicative of an activation of the PTT input switch transitioning the switch from a deactivated state to an activated state, transmit one or more pulses to the wireless communication device via the male plug by momentarily grounding the audio input signal line to create each pulse to indicate the transition of the PTT input switch to the activated state.

12. The system of claim 11, wherein the control circuit is further configured to, responsive to detecting the activation of the PTT input switch, generate and communicate via the male plug a first number of pulses, each pulse comprising a low impedance electrical connection to ground for at least a first duration and each pulse separated from another pulse by a high impedance electrical connection for at least a second duration.

13. The system of claim 12, wherein the control circuit is further configured to, responsive to detecting a signal from the wireless accessory device indicative of a deactivation of the PTT input switch transitioning from the activated state back to the deactivated state, and, while the PTT input switch remains deactivated, terminate transmission of signals via the male plug to the wireless communications device.

14. A method in an audio jack adaptor for enabling push-to-talk, PTT, functionality between an audio input/output wireless accessory device and a wireless communications device, the method comprising:

receiving one or more signals from a wireless communication device via a male plug, the male plug further comprising an audio input signal line for providing audio received from the wireless accessory device to the wireless communication device via the audio jack;

responsive to receiving the one or more signals, translating the one or more signals by a control circuit communicably coupled to the male plug;

transmitting the one or more translated signals to the wireless accessory device via a wireless transceiver communicably coupled to the control circuit;

receiving a signal via the wireless transceiver indicative of an activation of a PTT input switch coupled to the wireless accessory device transitioning the PTT input switch from a deactivated state to an activated state;

responsive to receiving the signal indicative of the activation of the PTT input switch, transmitting one or more pulses to the wireless communication device via the male plug by momentarily grounding the audio input signal line to create each pulse to indicate the transition of the PTT input switch to the activated state; and while the PTT input switch remains in the activated state, translating signals from the wireless accessory device via the wireless transceiver and transmitting the translated signals via the male plug to the wireless communication device.

15. The method of claim 14, wherein receiving the one or more signals from the wireless communication device via the male plug comprises:

receiving the one or more signals via the male plug via a corresponding audio jack on the wireless communication device.

16. The method of claim 14, wherein transmitting the translated signals via the male plug to the wireless communication device comprises:

transmitting the translated signals via the male plug consisting of at least four conductors to a corresponding wireless communication device jack of the wireless communication device, the four conductors consisting of:

a pair of power transmission conductors; and a pair of differential data transmission conductors.

* * * * *